United States Patent [19]

Simmons et al.

[11] Patent Number: 5,028,017
[45] Date of Patent: Jul. 2, 1991

[54] MOBILE SYSTEM FOR DEICING AIRCRAFT

[75] Inventors: Charles M. Simmons, Memphis, Tenn.; James R. Thompson, Cove-Southaven, Miss.; Thomas V. Harkins, Jr., Memphis, Tenn.; Charles W. Talleg, Lake Coumovant, Miss.

[73] Assignee: Federal Express Corporation, Memphis, Tenn.

[21] Appl. No.: 390,707

[22] Filed: Aug. 8, 1989

[51] Int. Cl.$^5$ .............................................. B64D 15/00
[52] U.S. Cl. ........................... 244/134 C; 244/134 R; 239/75; 239/131; 239/135; 239/172
[58] Field of Search ....................... 244/134 C, 134 R; 239/130, 131, 172, 135, 423, 75; 219/301, 306; 236/93 R, 93 B, 12.12

[56] References Cited

U.S. PATENT DOCUMENTS

| | | |
|---|---|---|
| 3,243,123 | 2/1966 | Inghram et al. |
| 3,533,395 | 10/1970 | Yaste |
| 3,612,075 | 10/1971 | Cook |
| 4,032,090 | 7/1977 | Thronton-Trump |
| 4,073,437 | 6/1978 | Thornton-Trump |
| 4,191,348 | 11/1980 | Holwerda |
| 4,278,132 | 7/1981 | Hostetter ................. 244/134 C |
| 4,333,607 | 12/1982 | Meuller et al. |
| 4,553,702 | 11/1985 | Coffee et al. ................. 239/172 |
| 4,565,321 | 12/1986 | Vestergaard |
| 4,634,084 | 8/1987 | Magnusson |
| 4,723,733 | 4/1988 | McClinchy |
| 4,775,117 | 10/1988 | Standke ................. 244/134 R |
| 4,826,107 | 4/1989 | Thornton-Trump |
| 4,872,501 | 10/1989 | Hightower ................. 244/134 C |

FOREIGN PATENT DOCUMENTS 1266139  4/1968  Fed. Rep. of Germany.
822811  11/1959  United Kingdom.

OTHER PUBLICATIONS

Dow Publication, "Dow 1704-LTV-Aircraft Deicing-/Anti-Icing Fluid" (1988).

Primary Examiner—Joseph F. Peters, Jr.
Assistant Examiner—Christopher P. Ellis
Attorney, Agent, or Firm—Finnegan, Henderson, Farabow, Garrett and Dunner

[57] ABSTRACT

A deicing system for applying a deicing mixture to an aircraft is provided. Water is enclosed in a first tank, and deicing fluid in a second tank. A first pump transfers water through a heater, to a heat exchanger located in the second tank. The deicing fluid is thereby heated to a desired operating temperature by the hot water flowing through the heat exchanger, with the flow of hot water controlled by a heater control device. The first pump and second pump transfer heated water and heated deicing fluid, respectively, to a mixing chamber. A mixing control means controls the respective flows to provide the desired mixture. The mixture of water and deicing fluid is then applied to the aircraft via a nozzle.

26 Claims, 6 Drawing Sheets

MOBILE SYSTEM FOR DEICING AIRCRAFT

BACKGROUND OF THE INVENTION

1. Field of the Invention

The present invention relates to a system for deicing aircraft. In the preferred embodiment, the invention is directed to a mobile, one-step deicing system which utilizes a preselected ratio of heated water and heated Type II deicing fluid, thereby increasing the time period during which the aircraft is protected.

2. Description of Prior Art

In many circumstances, aircraft are subject to severe winter conditions during which ice and snow can accumulate on the aircraft and the control surfaces of the aircraft. The accumulation of snow and ice on aircraft presents a serious safety hazard, and it is therefore necessary to take all appropriate steps to ensure that an aircraft is protected against dangerous icing conditions.

One of the conventional methods of deicing aircraft is to apply a mixture of glycol (Type I) fluid and water at a 1:1 ratio, commonly known as a 50/50 glycol mix. This mixture is typically heated to approximately 180° to 205° F. and sprayed on the aircraft control surfaces at a rate of approximately 60 gallons per minute at a pressure of approximately 80 psi. Such a 50/50 mixture of water and glycol does a fairly good job of removing frost, ice, or snow from the aircraft, and during light winter precipitation and moderate temperatures will provide a short holdover time. Examples of apparatus and methods typically used to provide such water and glycol deicing are illustrated, by means of example only, in U.S. Pat. Nos. 3,243,123 to Inqhram et al; 4,073,437 to Thorton-Trumc; 4,032,090 to Thorton-Trumo; and 4,333,607 to Mueller et al. As disclosed in certain of the above patents, the deicing systems presently available often are included as part of a truck which can be driven to the aircraft.

In severe weather conditions, a 50/50 or similar mixture of water and glycol does not provide a sufficient protective coating or holdover time. In an attempt to solve this problem, some deicing vehicles have an extra tank of 100% glycol. After the aircraft is deiced by the heated water and glycol mixture in the first step, cold concentrated 100% glycol is then sprayed on the control surfaces in a cold state to provide an antiicing effect. This antiicing step with 100 percent glycol generally adds to the holdover time to some degree, but still provides only modest protection.

A second type of antiicing fluid, known as A.E.A. Type II fluid, has been used in Europe and in limited application in the United States. Type II fluid is a thixotropic, highly viscous fluid which provides longer holdover protection. However, Type II fluid is an extremely shear sensitive and temperature sensitive fluid which easily degenerates. It is also difficult to mix Type II fluids with other fluids, without degenerating the Type II fluid. Because of its unstable nature, it has been difficult to apply Type II fluid in a commercially acceptable and economic manner.

Type II fluid has been used in Europe with moderate success, but the application process is time consuming and inefficient. Generally, the Type II fluid is first premixed with water in a special vat located in a hanger or similar building. The mixture is then heated in the vat, and, when heated, transferred to a tank in a mobile truck. The truck then is driven to the aircraft, and the preheated mixture is finally applied to the aircraft.

Type II fluid has been used only on a limited basis in the U.S. To applicant's knowledge, the Type II fluid has been used in the U.S. only in a two-step process. In the first step, the aircraft is deiced through a hot water or glycol-water mix to remove all ice and snow from the aircraft. Then, a cold Type II fluid is coated onto the airplane.

The past processes and apparatus for using Type II fluid, therefore, have been expensive and time consuming. As a result, the use of Type II fluids, particularly in the U.S., is not well accepted.

SUMMARY OF THE INVENTION

It is an object of the present invention to overcome the above problems by providing a single mobile unit which can efficiently and economically heat and apply to aircraft mixtures of water and various deicing fluids, specifically including Type II fluid.

Another object of the present invention is to provide a deicing system which can apply a preselected mixture of heated water and heated Type II fluid, without unnecessarily degenerating the Type II fluid.

Still another object of the present invention is to provide a deicing system which can apply a preselected, heated mixture of water and Type II fluid that will in a single step both deice the aircraft and add a protective antiicing coating of Type II fluid on the aircraft.

Yet another object is to provide a mobile deicing system in which the mixture of water and the Type II fluid can be precisely controlled.

Another object is to provide a system which can mix heated water and Type II fluid, without degenerating the Type II fluid.

Additional objects and advantages of the invention will be set forth in part in the description which follows and in part will be obvious from the description, or may be learned by practice of the invention. The objects and advantages of the invention are realized and attained by means of the elements and combinations particularly pointed out in the appended claims.

To achieve the objects and in accordance with the purpose of the invention, as embodied and broadly described herein, the invention comprises a deicing system for applying a deicing mixture to an aircraft, that system comprising a first tank for holding water; a second tank for holding deicing fluid; a heater in fluid communication with the first tank for heating the water; a heat exchanger, located in the second tank and in fluid communication with the heater, for accepting heated water to heat the deicing fluid; heater control means in fluid communication with the water heater and the heat exchanger for flowing heated water through the heat exchanger until the temperature of the deicing fluid in the second tank reaches a predetermined temperature; a first pump in fluid communication with the first tank for pumping water; a second pump in fluid communication with the second tank for pumping deicing fluid; heater control means, coupled with the first pump, for flowing heated water through the heat exchanger until the temperature of the deicing fluid in the second tank reaches a predetermined temperature; mixing means in fluid communication with the first and second tanks for mixing the water and the deicing fluid; mixing control means for providing a preselected mixture of water and deicing fluid to the mixing means; and a nozzle in fluid communication with the mixing means to apply the preselected mixture to the aircraft.

In the preferred embodiment the system is placed on a truck or similar vehicle which can be driven directly to the aircraft to be deiced. The pumps are preferably positive displacement pumps which the inventors have found do not degenerate Type II fluid beyond acceptable limits, and the pumps are hydraulically driven by a hydraulic system powered by the truck's engine. The operation of the pumps and heating system are preferably computer controlled, and the system includes a pump-on-demand feature which minimizes any tendency of the Type II fluid to degenerate. The pump which pumps Type II fluid only operates when Type II fluid is being sprayed through the nozzle, and the computer control in combination with a feedback system ensure that a precisely controlled mixture of heated fluid is applied to the aircraft.

It is to be understood that both the foregoing general description and the following detailed description are exemplary and explanatory only and are not restrictive of the invention, as claimed.

The accompanying drawings, which are incorporated in and constitute a part of the specification, illustrate one embodiment of the invention and together with the description, serve to explain the principles of the invention.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
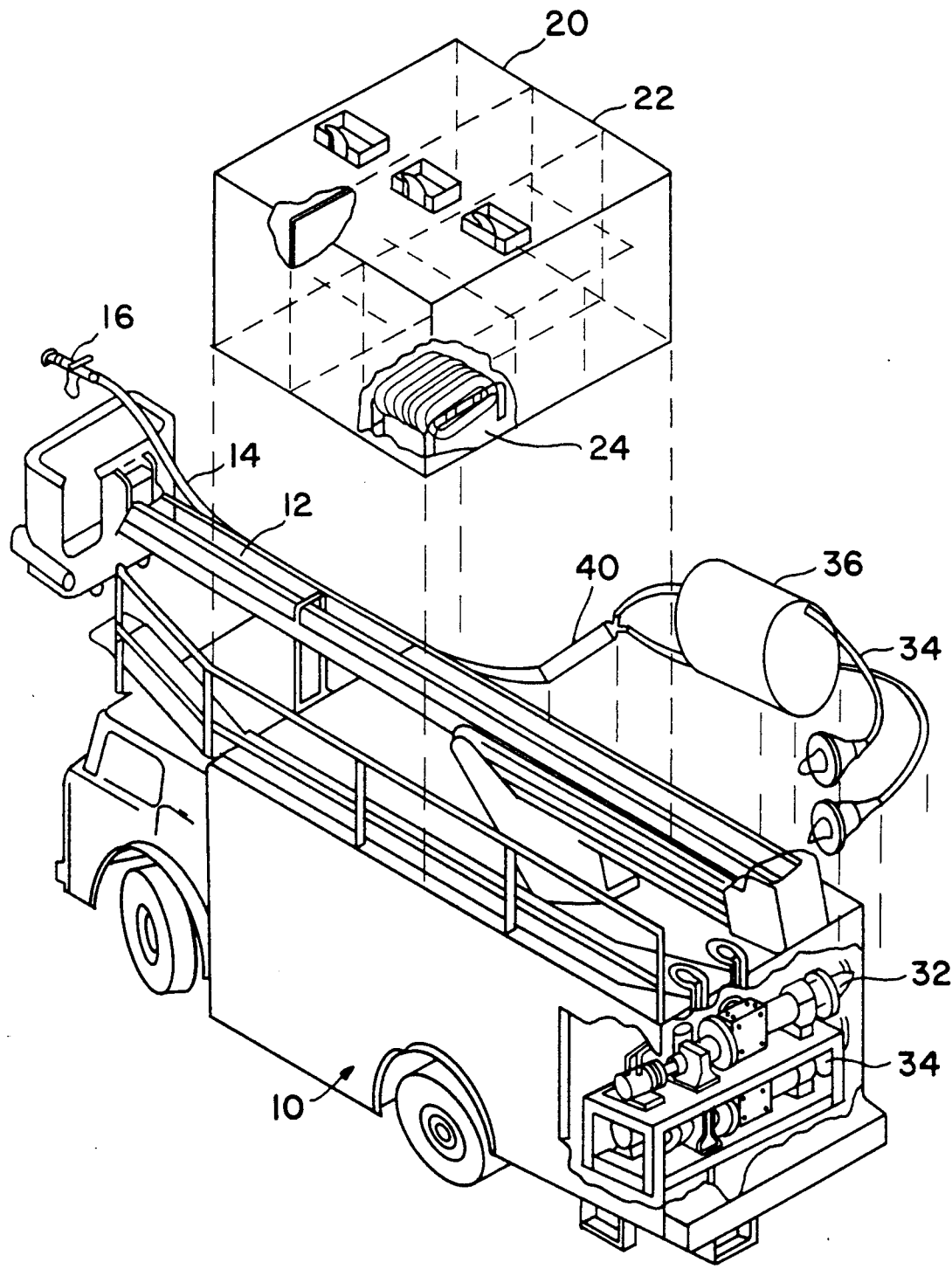
FIG. 1 is a perspective, partial cross-section of a vehicle which carries the deicing system of the present invention.

As shown in FIG. 1, the deicing system of the present invention is incorporated in a truck 10 so that the deicing system can be readily transferred to an aircraft to be deiced. The deicing truck includes a main body which houses the components of the deicing system of the present invention. The truck also supports a movable boom 12 and basket at its outer end to support a service person. A deicing hose 14 and nozzle 16 extend up the boom and into the basket so that a service person using the deicing system can spray deicing fluid on the plane at desired locations.

As will be described more fully below, the vehicle 10 contains a water tank 20 and a deicing fluid tank 22 for containing water and deicing fluid, respectively. The tanks can be filled through openings in the top of the tanks which are easily accessible at the top of the truck. The water tank typically has a capacity of approximately 600 gallons, and the deicing fluid tank typically has a capacity of 1,200 to 1,400 gallons. As shown generally in FIG. 1, a heat exchanger 24 is contained in the deicing fluid tank 22. This heat exchanger and various components will be described more fully below.

The deicing system of the present invention includes a separate pump for water and a separate pump for the deicing fluid. The water pump 32 and the deicing fluid pump 34 are positioned at the rear of the truck so that they are easily accessible. Both pumps are driven by variable-speed hydraulic motors 33 and 35 which are controlled by electrically-controlled proportional valves. Both pumps are of the positive displacement type, and these pumps are rated to pump heated fluids having temperatures as high as 205° F.

As shown generally in FIG. 1, water from pump 32 flows through water line 34 to a heater 36. The heater 36, as disclosed more thoroughly below, directly heats the water. The heated water as it flows through heat exchanger 24 then heats the deicing fluid, preferably Type II deicing fluid. The heater in the preferred embodiment has a capacity of at least 2,000,000 BTUs.

The deicing fluid is indirectly heated by heated water which flows through heat exchanger 24 and then returns to water tank 20. When the water and the deicing fluid reach appropriate temperatures, the heated water and fluid are then separately pumped by pumps 32 and 34, respectively, into a mixer 40 where the fluids are thoroughly mixed. The mixture of heated water and deicing fluid then flows through hose 14 and nozzle 16 onto the aircraft to be deiced.

Figure 2:
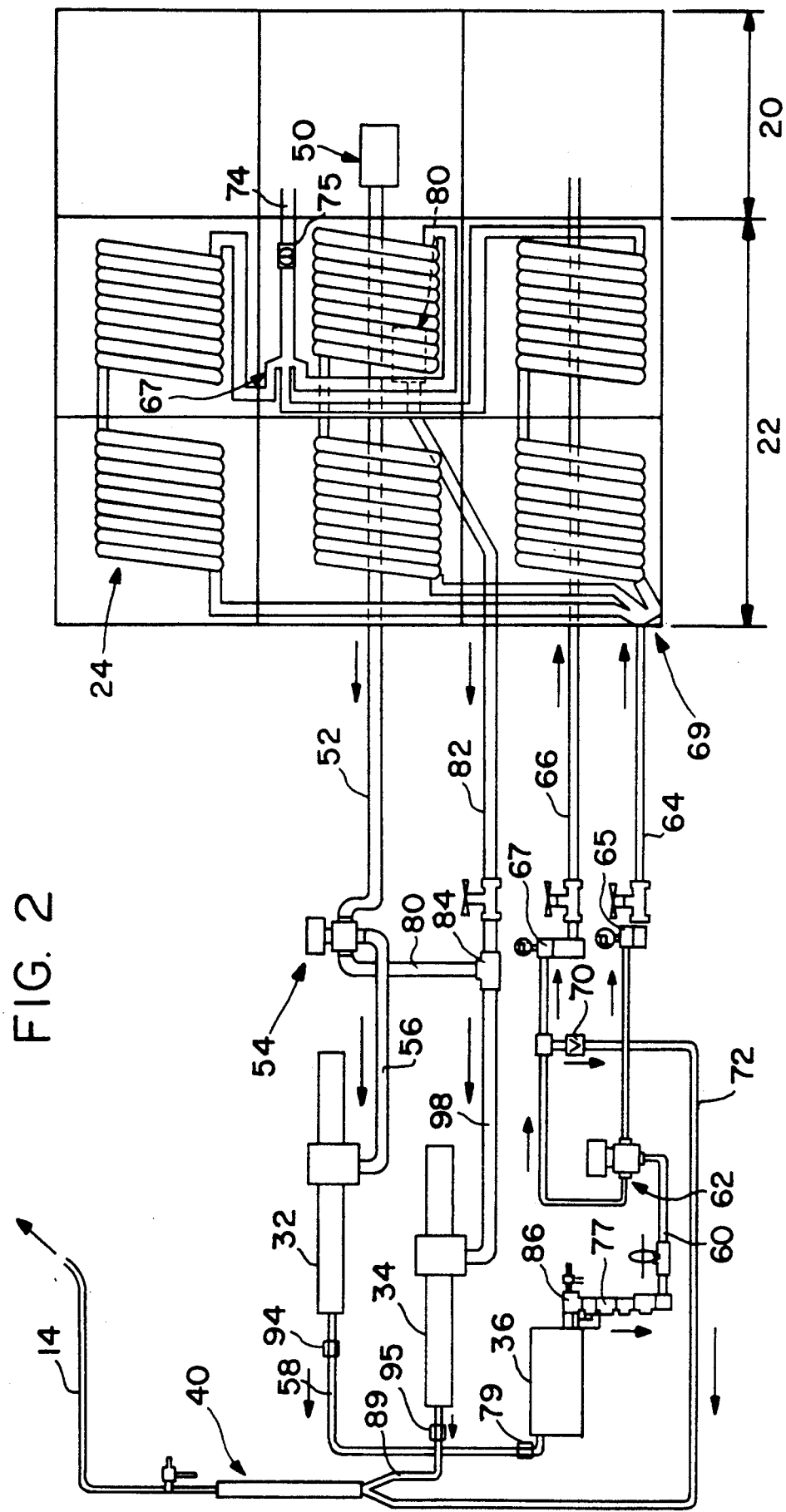
FIG. 2 is a schematic diagram illustrating several components of the deicing system, including the fluid flow circuits of the present invention.

FIG. 2 is a schematic diagram illustrating in greater detail the flow of water and fluid in the present preferred embodiment. The flow system includes water tank 20, deicing fluid tank 22, water pump 32, deicing fluid pump 34, heater 36, mixer 40, and a hose 14. Water from water tank 20 is pumped by pump 32 through a suction strainer 50 and water tubing 52 to a electrically controlled ball valve 54. Ball valve 54 is connected by tubing 56 with the water pump 32, and water from ball valve 54 then flows out through tubing 58 to heater 36. The water then flows out heater 36 through tubing 60 to a second electrically controlled ball valve 62 from which it can flow either into heat exchanger 24 by tubing 64 or to water tank 20 by tubing 66. Check valves 65 and 67 are placed in lines 64 and 66, respectively, to insure that water and fluid in the tanks does not flow backward.

Between the ball valve 62 and tubing 66 is a T connection 70. A water pipe 72 leads away from the T connection and ends at mixer 40. When the nozzle 16 is open and the ball valve directs water toward tubing 66, the water will flow through the mixer 40 and through nozzle 16, since that is the path of least resistance. If the nozzle is closed, water returns through check valve 67 and tubing 66 to the water tank. If the ball valve directs flow to line 64, then the water flows into the heat exchanger 24, and ultimately through line 74 and a pressure relief valve 75 back into water tank 20.

As shown in FIG. 2, a tree of temperature sensors 77 are located at the outlet end of the heater 36. In addition, a temperature sensor 79 is positioned at the entry of the heater. Water temperature therefore can be measured before and after the heater. This information is supplied to a programmable computer which, as described below, controls the heater and the rest of the system.

The deicing fluid contained in the deicing tank 22 is pumped by pump 34 through suction strainer 80 out through line 82 to T connection 84. At T connection 84 the deicing fluid can either flow through line 86 through ball valve 54 and into water pump 32, or through line 88 into pump 34 and then through line 82 to mixer 40. As will be described more fully below, deicing fluid flows through line 86 and eventually into water pump 32 only during a purging operation. When the deicing process is activated, the deicing fluid flows directly to the mixer through lines 82 and 88, pump 34, and pipe 89. The lines 82, 88 and 89 have smooth interior surfaces, and the pump 34 is a positive displacement pump. The fluid, therefore, is not subjected to high shear which can degenerate the fluid.

The preferred embodiment of the heat exchanger 24 is illustrated in FIG. 2. As shown, the heat exchanger has six separate coils of tubing, which are preferably one inch copper tubing. The water as it enters into the heat exchanger through line 64 goes through a manifold 65 from which it flows into three pairs of coils, each pair being in series. The output of each of these two coils meet at a three-way collector 67 and then flow through a line 74 back into water tank 20. A check valve 75 ensures that water will not flow backward from the water tank into the heat exchanger. In the preferred embodiment, the heat exchanger is made of one inch copper tubing, and the six coils have a total length of approximately 400 feet. The tubing leading into and exiting from the fluid tank add an additional 50 feet of tubing. The coils are positioned in the deicing tank so that their size, configuration, and location provide optimum heat transfer to Type II fluid, keeping degeneration to a minimum and well within manufacturer's recommended levels.

Figure 5C:
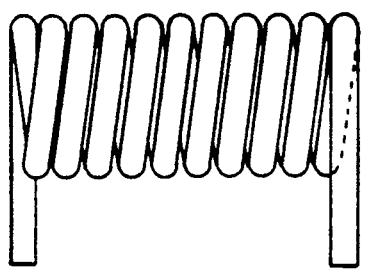
FIG. 5C is a side view of the coil illustrated in FIG. 5A.
Figure 5A:
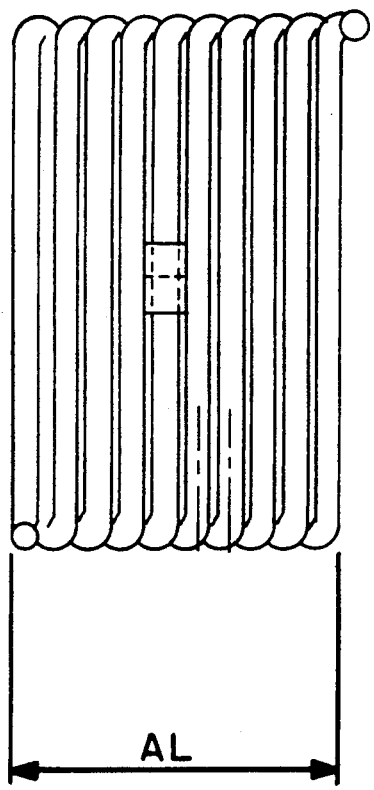
FIG. 5A is a plan view of a coil which is part of the heat exchanger of the present invention.
Figure 5B:
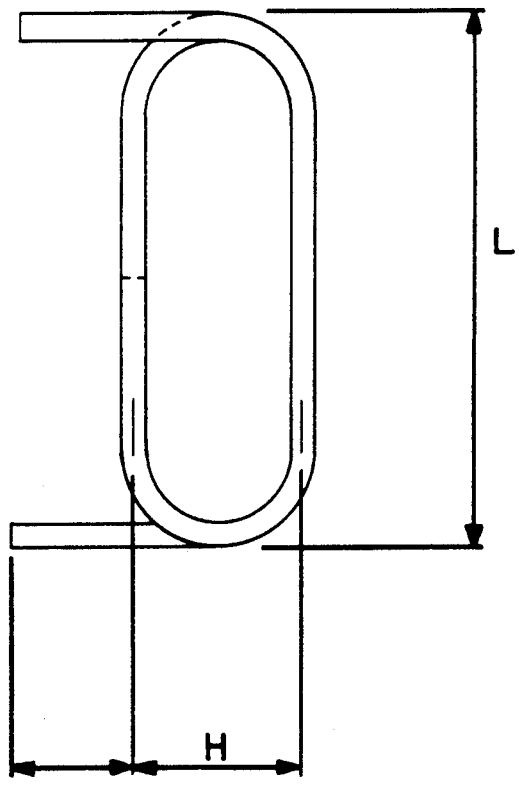
FIG. 5B is a side view of the coil illustrated in FIG. 5A.

One of the problems associated with Type II fluid is that it will degenerate if it is not heated properly. The inventors found that an attempt to circulate the Type II fluid in the tank by mechanical means, such as a mechanical stirrer, in order to increase heat transfer lead to undesirable degeneration of fluid. They also found that efforts to use vertically oriented coils did not provide the best thermal flow of fluid and heat transfer efficiency. Through analysis and experimentation, the inventors found that in the preferred embodiment, the coils should be positioned with their axis aligned horizontally, as shown in FIG. 2 and FIG. 5B. The coils of the heat exchanger are positioned in the lower portion of the fluid tank and are preferably spaced just slightly above the bottom of the tank. In a preferred embodiment, the coils have a length L of approximately 28 inches and a height H of 10.5 inches. The axial length AL of each coil is 18 inches. The coils that are in series are spaced from each other by approximately 2 inches. The tank has a height of approximately 53 inches, and the tank includes vertical walls that create six compartments in the tank. Flow channels, such as rectangular holes, are cut in the walls to allow fluid to move from compartment to compartment. This configuration of coils, vertical walls, and flow channels creates a thermal flow of the Type II fluid that enhances heat transfer and uniform heating, without degenerating the fluid. As shown in FIG. 2, the strainer 80 is positioned inside one of the coils to further ensure that heated Type II fluid is supplied to the nozzle.

The deicing system of the present invention includes means for sensing the temperature and pressure of the water and deicing fluid. Thermocouples 90 and 92 are positioned in the water tank and fluid tank, respectively, to constantly monitor the temperature in the tanks. The thermocouples are electrically connected to a programmable computer. In addition, fluid level sensors are included in the tanks to sense the volume of liquid in the tanks.

A flow volume sensor 94 is included in the system below water pump 32 to sense the flow of water. A pressure sensor 95 is located between fluid pump 34 and mixer 40 to sense the pressure in that line. This sensor is coupled to the computer control. A temperature sensor 97 is positioned before heater 36 to sense the temperature of water entering the heater, and another temperature sensor 77 is positioned at the outlet of the heater 36 and before ball valve 62. If the water temperatures entering or leaving the heater exceed preselected levels, the heater automatically will turn off. In addition, an electrically controlled on-off switch 81 is electrically coupled to the computer control so that the computer can activate and deactivate the heater, as desired.

Pumps 32 and 34 are hydraulically driven positive displacement pumps of either the diaphragm or progressive cavity pumps. These pumps are preferred because they subject fluids, particularly thixotropic Type II fluids, to considerably less shear than centrifugal or piston pumps. One pump that the inventors have found to be successful is the Robbins & Myers Moyno pump no. 2E022G1-CDF-AAA, which is readily available on the market. The positive displacement pumps 32 and 34 are each driven by a variable speed hydraulic drive motors 33 and 35, the speed of which is controlled by electrically-controlled proportional valves 111 and 113. The two pumps can be operated at any desired speed, flow rate, or pressure within the pump manufacturer's rating. Because the pumps are positive displacement pumps, the flow rate is directly related to the speed (rpm) of the pumps. In the preferred embodiment the pumps have a flow capacity of 0.22 gallons per revolution, a pressure capacity of 250 psi, and a temperature capacity of 205° F.

Heater 36 is a conventional 2,000,000 BTU heater which uses unleaded gasoline as a fuel. The inventors have utilized a Thorton-Trump heater which is available on the market. The heater includes a fan 37 which supplies oxygen to the heater and also serves to exhaust combustion gases. The heater fan 37 is hydraulically driven, in a manner described below.

Figure 3:
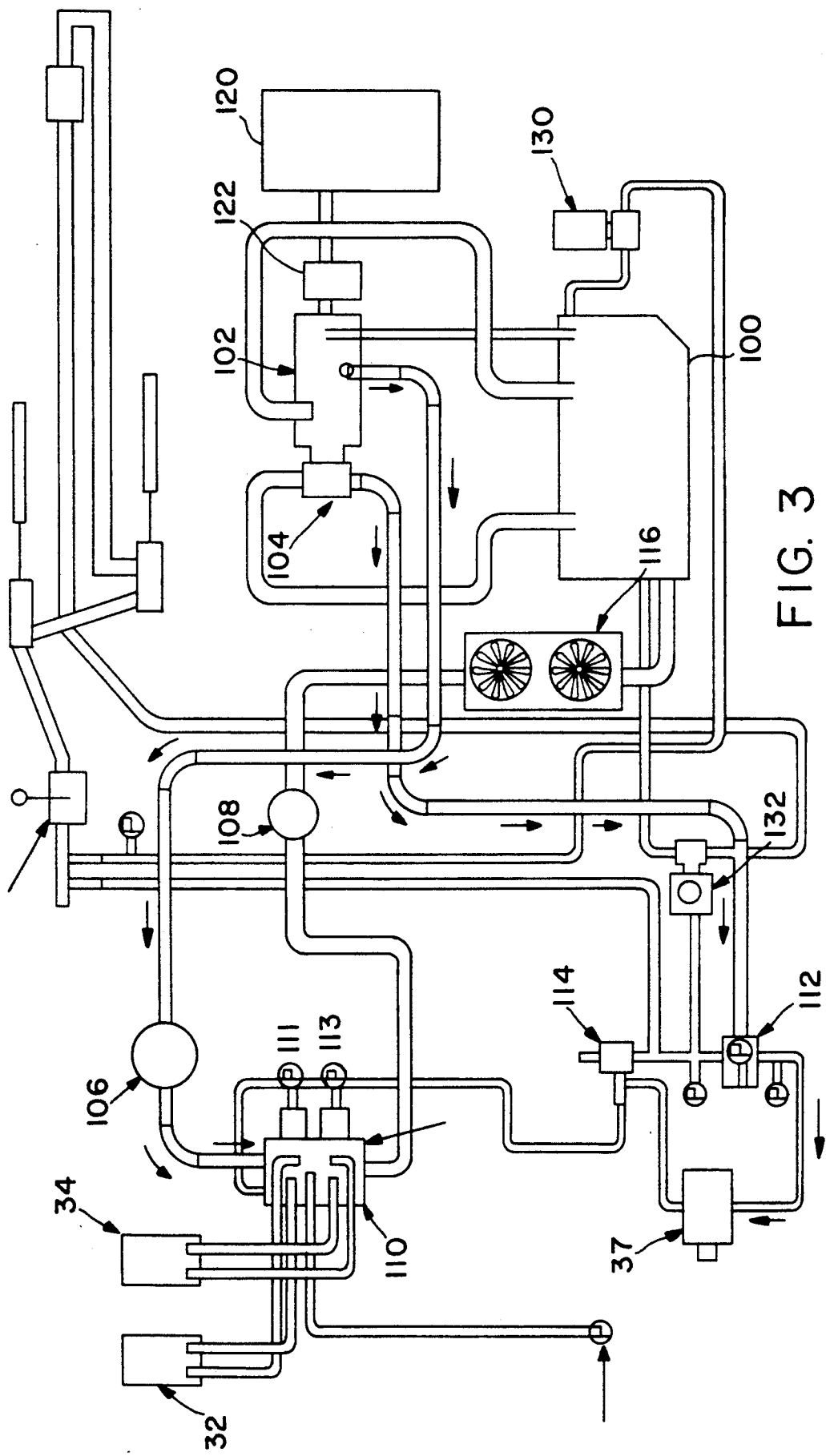
FIG. 3 is a schematic diagram illustrating several components of the invention, including the hydraulic circuits of the present invention.

The hydraulic system of the present invention is illustrated schematically in FIG. 3. The system includes hydraulic fluid tank 100, a main hydraulic pump 102, a secondary or piggyback hydraulic pump 104, filters 106 and 108, a manifold 110, a priority flow divider 112, a flow regulator 114, an oil cooler 116, and hydraulic flow lines connecting the various elements.

As shown in FIG. 3, the main hydraulic pump 102 is driven by the truck engine 120 which is connected through shafts and power takeoff (PTO) 122 to the main hydraulic pump 102. When the system is operated, the engine 120 is run at a preselected, constant rpm by a governor, in a manner well known in the art. The hydraulic pump therefore is driven at a constant rpm during the operational phase of the deicing system. The speed of the engine and the gear ratios of the PTO are selected so that the hydraulic pump can provide the maximum flow of hydraulic fluid demanded at peak levels. The main hydraulic pump 102 is a flow and pressure compensating type which is self-regulating to the demand of the hydraulic system downstream of the pump. In the embodiment shown in FIG. 3, a secondary or piggyback pump 104 is connected to the output shaft of hydraulic pump 102 and therefore is also driven by engine 120.

In the system illustrated, the output of the main hydraulic pump is used to power certain elements of the system while the output of the secondary pump is used to power other elements. It should be appreciated, however, that a single pump could be used to power the entire system.

In the embodiment illustrated in FIG. 3, the hydraulic fluid from main hydraulic pump 102 is used exclusively to power hydraulic motors 33 and 35 which receive hydraulic fluid through manifold 110. Electrically-controlled proportional valves 111 and 113 control the amount of hydraulic fluid, if any, that is supplied to hydraulic motors 33 and 35, respectively. As the proportional valves are opened to power the pumps and drive them at increased speeds, the main hydraulic pump 102 automatically matches the load. When both proportional valves are closed and neither fluid pump is being driven, the hydraulic system pressure reaches a predetermined psi value and the hydraulic pump, although still being driven by the PTO, ceases to pump hydraulic oil. When the pumps are operated, hydraulic fluid flows into and out of the pumps at a desired rate to achieve the desired speed and flow rate, in the manner described more fully below.

The secondary hydraulic system served by the secondary or piggyback pump 104 provides hydraulic fluid to operate the fan motor 37, the spring locks of the truck, and the boom. The priority flow divider 112 prioritizes the flow of hydraulic fluid from the secondary pump and provides the fan motor 37 with a precise flow rate regardless of the secondary pump output, therefore keeping the fan at a constant speed. The priority flow divider 112 is not connected to the computer control. In the present embodiment, this speed is manually adjustable. The flow regulator 114 serves the purpose of a manual adjustment of the fan speed. The hydraulic fluid which powers the fan motor 37 flows to the manifold 110 and is then returned ultimately to tank 100.

Although not necessary for the present invention, FIG. 3 also illustrates an emergency hydraulic pump 130 which, in emergencies, provides emergency hydraulic fluid to the boom and boom control. The system also includes an emergency dump valve 132 for providing emergency dumping of hydraulic fluid, if it reaches a dangerous pressure.

The present invention overcomes the problems associated with the unstable Type II fluid by minimizing shearing of the fluid and by indirectly heating the fluid with a heat exchanger. The Type II fluid flows directly from the tank 22 to the mixer 40 without flowing through proportional valves or recirculating through flow paths. The pump 34 is a positive displacement pump that also minimizes shear, and the pipes or tubing to and from the pump 34 have smooth internal surfaces. The mixer 40 is also specially designed to minimize degeneration of the fluid, as explained below. The heat exchanger permits the Type II fluid to be gradually heated in a manner that the inventors have found does not degenerate the fluid. In the preferred embodiment, the deicing fluid is heated to as high a temperature as possible, without exceeding manufacturer's recommendations. For the Type II fluid, the fluid is heated to a preselected temperature of approximately 155°-157° F. and is then mixed with heated water within the range of 205° F. This mixture is then applied to the aircraft in a highly viscous and hot state. In most applications, a one-step operation will both deice and anti-ice the aircraft.

Figure 7:
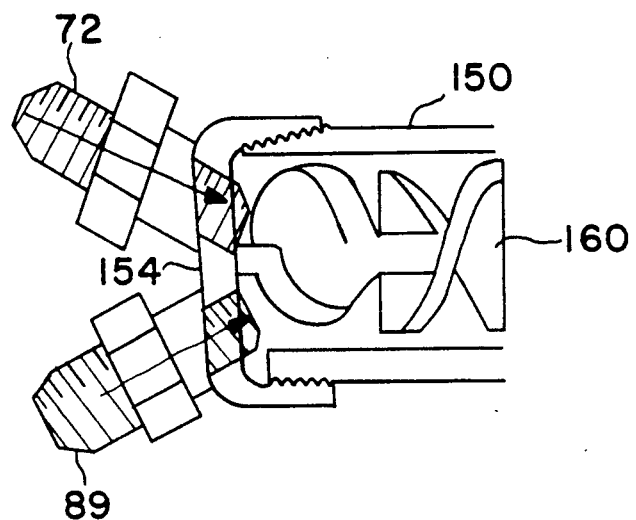
FIG. 7 is a partial cross-sectional view of the mixer element schematically illustrated in FIG. 6.
Figure 6:
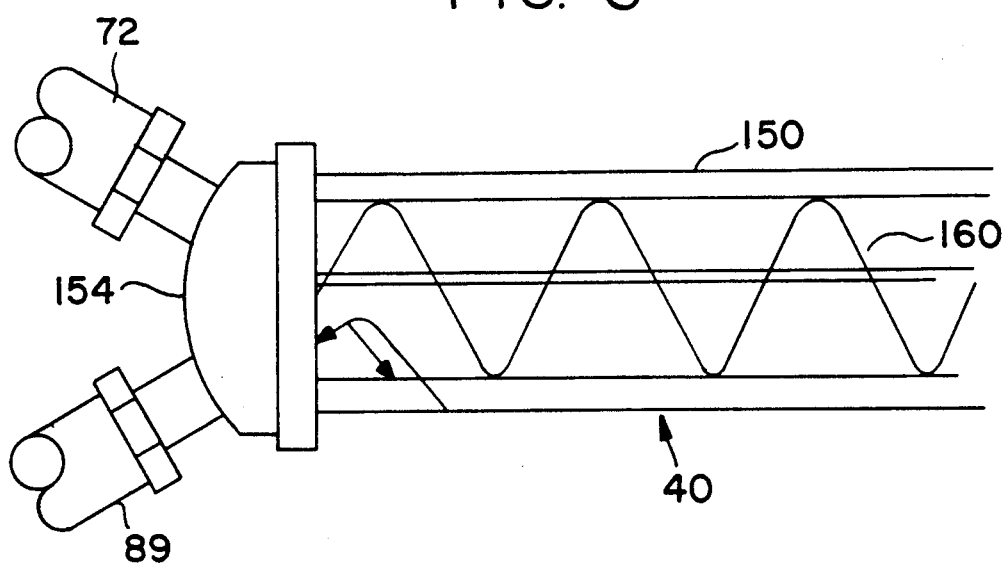
FIG. 6 is a partial cross-sectional, schematic view illustrating the fluid mixer of the present invention.

The mixer 40 is described more fully by reference to FIGS. 6 and 7. The mixer 40 includes a cylindrical sleeve 150 which forms a cylindrical housing. In the preferred embodiment, the cylindrical sleeve has an inside diameter of approximately 2 inches and a length of approximately 3 feet. Water line 72 and deicing fluid line 89 are connected to cap or manifold 154 which is connected in a sealed manner to sleeve 40. A mixing element 160 is held within the mixing tube to achieve the mixing of the water and Type II fluid, without unduly degenerating the Type II fluid. In the preferred embodiment, a spiral knife-edged mixer is fixed to the cap 154 so that the mixer cannot slide or otherwise move in the mixer. This knife-edged mixer has an auger-like shape but has a plurality of discontinuities along its length so that the auger for a given length flows the fluid in clockwise manner, then counter-clockwise, and so forth. Such a knife-edged mixer is manufactured and marketed by TAH Industries, Inc. of Imlaystown, N.J. In the preferred embodiment, the outer diameter of the knife-edged mixer is just slightly less than the inner diameter of sleeve 40. The mixing element is fixed to the cap 154 in such a manner that water is originally introduced on one side of the auger and deicing fluid is introduced on the other side of the mixing element. This combination of features has proven to thoroughly mix the water and deicing fluid without unduly degenerating the Type II fluid.

In order to make the system efficient and economic, the inventors designed a control system which is both simple and precise. Speed sensors 160, 162 and 164 (shown in FIG. 4) are attached to each of the pumps 32, 34 and the fan 37, respectively. A speed sensor 168 is also attached to the main hydraulic pump 102. In the preferred embodiment, magnetic detectors are placed adjacent to the shafts of the pumps and fan, and the shafts of the pumps and fan are splined so that the magnetic detectors can detect incremental rotation of the shafts. The information representing the speed of the pumps and fan are fed into the programmable computer. The computer is also connected to and electronically controls the proportional valves 111 and 113 associated with pumps 32 and 34, to thereby regulate the flow of fluid to the pumps and thus regulate the speed of the pumps. In addition, the computer is electrically connected to the pressure sensor 95 and is electrically connected to the fan switch 81.

Figure 4:
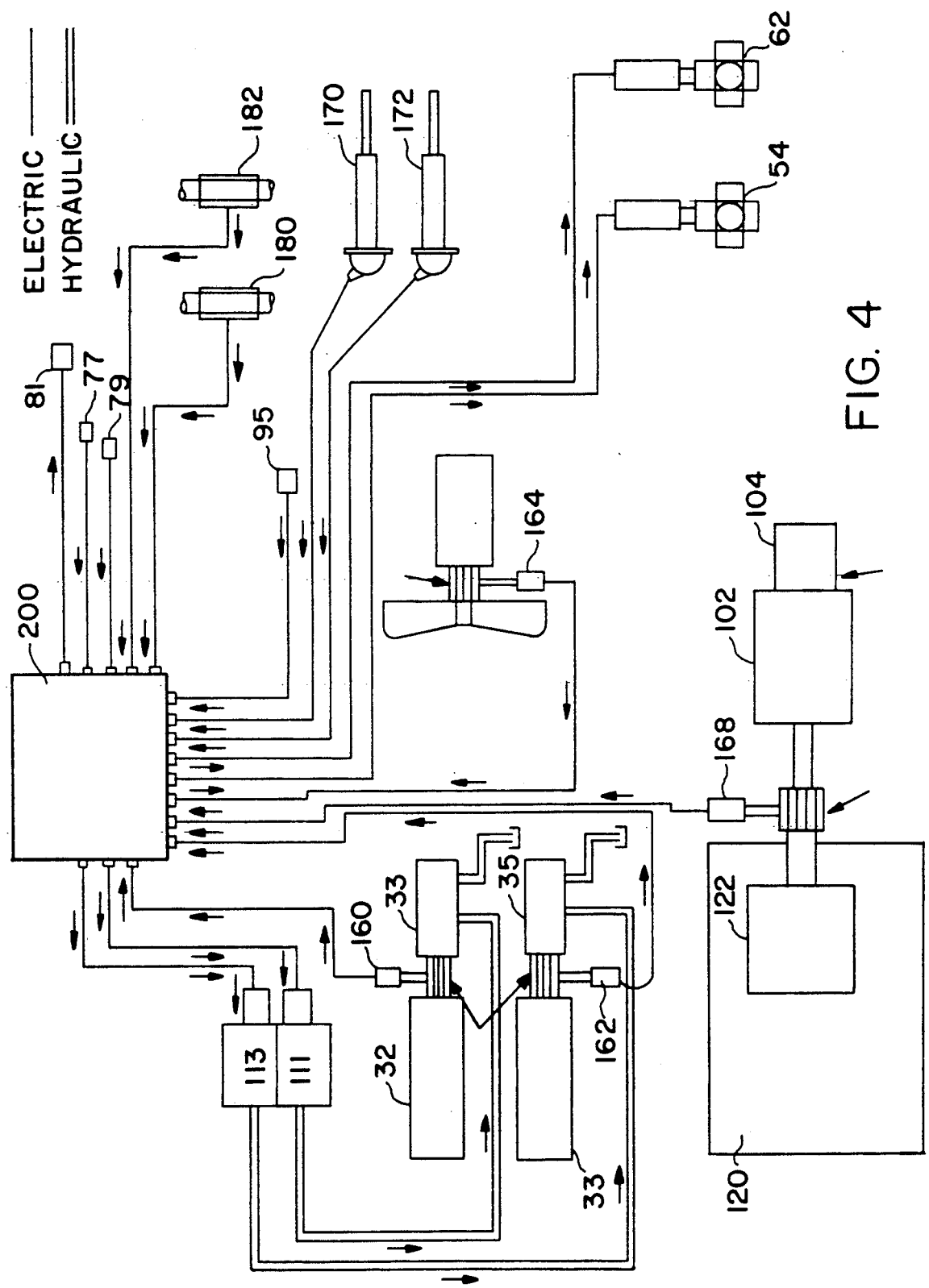
FIG. 4 is a schematic diagram illustrating certain components of the control of the present invention, including the computer controller, electrical sensors, and electrically controlled valves.

The control system of the present invention is diagrammatically illustrated in FIG. 4. The electronic control system includes a programmable logic controller 180, such as a OMRON C-200-H computer. The controller receives through thermocouple 170 the sensed temperatures of water in tank 20, through thermocouple 172 the sensed temperature of deicing fluid tank 22, through sensor 79 the sensed temperature before heater 36, and through sensor 77 the sensed temperature after heater 36. The controller also receives signals from tank level sensors 180 and 182 which sense the level of fluid in the water tank and deicing fluid tank, respectively. The controller also constantly receives sensed pressures exiting the heater and sensed pressures from pressure sensor 95. The sensed pressure from pressure sensor 95 can effectively inform the computer whether the nozzle 16 has been opened or closed, since the pressure will drop when the nozzle is open and increase when the nozzle is closed. The controller also receives sensed speeds of the fan motor and pumps 32 and 34. Based upon the information received by the controller and the input data originally stored in the controller's memory, the controller sends control signals to ball valves 54 and 62, proportional valves 111 and 113 and heater switch 81. The modes of operation and the priority followed by the controller will be described below in reference to the modes of operation of the invention.

The present invention preferably includes a control board located on the truck at a position readily accessible to the operator. The board generally references the controls and information available. A control panel would include a plurality of push buttons which are easily accessible to the operator. For example, the push button controls might include a heat cycle button, a 100 percent Type II button, a 75/25 percent mix button, a 50/50 mix button, a purge button and a reset button. The control panel also would provide digital display of the heater fan speed in rpm's, the power takeoff speed in rpm's, the water pump speed in rpm's, the fluid pump speed in rpm's, the water temperature, the fluid temperature mode of operation (heat cycle, mix selection, etc.), one condition of the purge valve (opened or closed), the condition of the heat exchanger valve (opened or closed) and the ratio of the fluid pump speed to the water pump speed.

The heatcycle mode, the fluid spraying mode, and the purge mode will now be described. In describing the operation of these modes, reference will be made to Type II deicing fluid, since that is the preferred fluid which will be used by the present invention. One such Type II fluid is Dow 1704LTV fluid, a fluid having a glycol content of at least 50 percent, plus a thickener system which forms a pseudoplasticfilm that protects the aircraft from rapid deicing and increases its holdover time. This and similar Type II fluids work particularly well with the system of the present invention. It should be apparent, however, that the system can also be used with other deicing fluids, such as Type I glycol fluid. The present invention, therefore has broad applications since a single system can apply a wide variety of deicing fluids in either two or one-step applications, depending upon weather conditions and economic factors.

In normal operations, the truck is driven to a location where the aircraft will be deiced. Once the truck is stopped and the gearshift is placed in neutral or park, the governor on the truck engine brings the engine up to the predetermined speed and keeps the engine speed, and therefore the speed of the hydraulic pumps, constant. The heater combustion fan is brought to operational speed, and the operator then pushes the button labeled "heat cycle" and the programmable logic controller (PLC) begins to scan the program and run the section of the program dedicated to heat cycle. During the heat cycle, a reference light on the panel lights up to assure the operator that the heat cycle has begun.

The PLC as it scans and runs the heat cycle program first checks to assure that the heat exchange valve (ball valve 62) is open and that the purge valve (ball valve 54) is closed. This information is provided to the PLC by motion sensors associated, respectively, with heat exchange valve 62 and purge valve 54. If the valves are not in the proper position, the PLC sends electrical commands to properly position the valves.

Once the valves are in the proper position, the PLC then provides a predetermined, ramp or similar signal to the terminals of the proportional valve 111 associated with the water pump 32. As a result, the pump 32 begins to pump water through the system at a selected rate. As the water pump is operated at the desired speed, water is drawn from the storage tank 20 and circulated through the coils in the heater 36, circulated through the heat exchanger 24 located in the Type II tank 22, passed through a pressure control valve 75, and then returned to the water storage tank. At the same time, the heater combustion fan blows air into the heat combustion chamber to purge the chamber of any unwanted deposits of fuel and gases.

Once the system is in this condition, the operator can initiate heating, or the computer can be programmed to activate the heater. Once energized, the heater is ignited and begins to burn fuel, typically unleaded gasoline. The heater thus begins to heat the water circulating through the heater coils. The water temperature before and after the heater are sensed to ensure that the water is not heated beyond a predetermined temperature and to ensure that the heater is working properly. The heated water then flows through the heat exchanger located in the Type II tank, and some of the heat in the water is transferred to the Type II fluid.

While both the water and Type II fluid are being heated, the temperature of the respective fluids in the tanks can be visually monitored by the operator. In addition, these sensed temperatures are constantly provided to and monitored by the PLC. Speed sensor 94 also provides the PLC with feedback information regarding the actual speed of the water pump 32, and therefore the flow rate of the water. The PLC constantly compares the actual speed with the program data representing the desired speed and flow rate of the water pump for optimum operation. For the preferred embodiment disclosed, the optimum flow rate is within the range of approximately 60 to 80 gallons per minute. Through this control loop, the desired rpms of the water pump, and therefore the desired flow of water, can be monitored and controlled.

The water pump will continue to circulate water through the heater 36 and heat exchanger 24, transferring heat to the Type II fluid, until the Type II fluid reaches its maximum allowed temperature. For Type II fluid now being used, the maximum temperature is within the range of 155° F. This maximum allowed temperature, sensed by thermocouple 172, is recognized by the PLC which sends a control signal to close the heat exchange valve 62. Water will continue to flow through the heater coils and return to the storage tank by line 66 but will not flow through the heat exchanger. When the temperature of the water in the storage tank 20, sensed by thermocouple 170, reaches a predetermined temperature, usually 205° F., the PLC will cause the heater to automatically shut off, but remain on standby condition. At this stage, both water and Type II fluid are at maximum operational temperatures and ready for use, and water continues to flow through the system. If the temperature of either water or Type II fluid drops below the predetermined temperature levels, the process of reheating the water or Type II fluid will automatically begin. A drop in the water temperature will cause the heater to turn on, and the temperature of the Type II fluid will control whether water flows through the heat exchanger.

Under ordinary circumstances, water and deicing fluid are not applied to an aircraft until both the water and fluid have been heated to the optimum temperatures. For emergency use of the fluids which may not be at optimum temperatures for deicing, a push button on the control panel labeled "reset" will override the heat cycle mode, allowing the system to be ready for the operator's use, at lower temperatures. By reviewing the control panel, the operator will know the actual temperatures of the water and deicing fluid when he applies the fluid in such an emergency situation.

When the water and deicing fluid reach the optimum temperatures, or when the reset button is pushed, the system is ready to supply fluid through nozzle 16 and onto the aircraft to be deiced. Typically, a mixture of water and deicing fluid is applied to the nozzle. When nozzle 16 is opened, water, which is being constantly pumped through the system by water pump 32, flows through line 72 into mixer 40 and then through hose 14 and out nozzle 16. When nozzle 16 is opened and deicing fluid is called for, the deicing fluid pump 34 is activated, and deicing fluid flows directly through lines 82 and 88, pump 34, and line 89 to the mixer. The heated deicing fluid is thoroughly mixed with heated water, and the resultant mixture is applied through hose 14 to nozzle 16.

In the fluid spraying modes, the system permits an operator to spray the fluids at any desired percentage mixture, since the mixture can be regulated by regulating the rpms of the water pump and the fluid pump, particularly their ratio. For the purposes of illustration, it will be assumed that the control panel includes push buttons for providing 100 percent Type II fluid, a 75/25 percent mixture of Type II fluid to water, and a 50/50 percent mixture.

When one of the spray buttons is pushed, for example the 75/25 button, the PLC will then read a previously stored program associated with that mixture. For a given desired mixture and given pump and fluid characteristics, the pump speeds and relative ratios needed to provide a given mixture can be readily calculated. This information, or even the underlying equations, are stored in the PLC. That particular section of the program relating to a 75/25 mixture outputs a predetermined rpm voltages to the proportional valves 111 and 113 which control pumps 32 and 34. This control can be exercised over either of the two pumps independently, or both simultaneously. The predetermined rpm voltages causes the pumps to operate and pump water and fluid to the mixer and ultimately through the nozzle onto the aircraft. Simultaneously, the speed sensors on the pumps provide the PLC with instantaneous feedback concerning actual speed of the pumps, and therefore flow of the pumps. Based upon the feedback and the comparison of the actual rpms with the desired, programmed rpms, the PLC makes corrections in valving to ensure that the desired mixture is achieved. Because the fluid pumps are of a positive displacement type, the rpms reflect flow rates which reflect fluid volumes. Thus, the PLC maintenance of the pumps assures the operator that the volume percentage of mix will be accurate at the spraying nozzle. In addition, the system permits an operator to visually check these percentages by reviewing the digital displayed values of the speeds and ratio of the pumps.

The deicing system of the present invention includes a pump on demand feature. Pressure sensor 95 recognizes a rise in pressure whenever the spraying nozzle 16 is closed and a drop in pressure whenever the spraying nozzle is open. This pressure rise or drop information is fed to the PLC which, in turn, turns off or on the voltage to the hydraulic valving which controls the pump's speed. When the nozzle is opened and pressure drops, the PLC causes the fluid pump 32 to operate. The PLC also ensures that the fluid pump rotates at the speed necessary to provide the correct mixture to the mixer 40. When the nozzle is closed and the sensed pressure at sensor 95 increases, the PLC decreases the speed of or stops the fluid pump 34. This pump on demand feature eliminates the need for fluid circulation of the Type II fluid or pressure control valving of Type II fluid, both of which will degrade Type II fluids significantly.

The present invention also includes a purge mode in which water is purged from the water pumping system to prevent freeze damage when the system is not in use. Ball valve 54 is located downstream, but in close proximity, to the water tank 20. When the push button labeled "purge" is activated, the PLC causes ball valve 54 to open the path of Type II fluid from the Type II fluid storage tank to the water pump and simultaneously close the path of water from the water storage tank to the water pump. The PLC then sends signals to proportional valve 111 which causes water pump 32 to pump enough Type II fluid to replace the water leading to and in the heater coils, heat exchanger, and piping between the heat exchanger and the water storage tank. This rerouting of the Type II fluid through the water pumping system is done in a timed sequence controlled by the PLC. By controlling the flow and timing of the purge, just a sufficient amount of deicing fluid is pumped through these elements to purge them of water. To protect the small area between the water tank outlet and the purge valve 54 from freeze damage, a electronic heat strip is applied to the outside of the tubing 52.

In view of the above disclosures, it will be apparent to those skilled in the art that PLC is programmed to perform the above functions, based upon original data included in memory along with the sensed temperature, speed and pressure data provided to the computer. The original data, such as maximum fluid temperature, pump speeds, ratios of pump speeds for a desired mixture, and so forth can be readily determined for a given system of components and given fluids. The resultant system can heat and apply a wide variety of deicing fluids, particularly Type II fluid, to aircraft. The system minimizes degeneration of Type II fluid, allows its user to apply a precise mixture of water and deicing fluid, and applies a thorough and complete mixture of water and deicing fluid. As a result, an aircraft in most circumstances can be diced and anticied in a single step.

Other embodiments of the invention will be apparent to those skilled in the art from consideration of the specification and the practice of the invention disclosed then. It is intended that the specification and examples be considered as exemplary only, with the true scope and spirit of the invention being indicated by the following claims.

What is claimed is:

1. A deicing system for applying a deicing mixture to an aircraft, the system comprising:
a first tank for holding water;
a second tank for holding deicing fluid;
a water heater in fluid communication with said first tank for heating the water;
a heat exchanger, located in said second tank and in fluid communication with said heater, for accepting the heated water to heat the deicing fluid;
a first pump in fluid communication with said first tank for pumping water;
a second pump in fluid communication with said second tank for pumping deicing fluid;
heater control means, coupled with said first pump, for controlling flow of the heated water through said heat exchanger until the temperature of the deicing fluid in said second tank reaches a preselected temperature;
mixing means in fluid communication with said first and second tanks for mixing the water and the deicing fluid;
mixing control means for providing a choice of a plurality of selected mixtures of water and deicing fluid to said mixing means; and
a nozzle in fluid communication with said mixing means to apply one of the preselected mixtures to the aircraft.

2. The deicing system of claim 1 wherein said heat control means further includes means for resuming the flow of heated water through said heat exchanger if the temperature of the deicing fluid in the tank falls below the preselected temperature.

3. The deicing system of claim 1 further comprising means for activating said second pump when the spray nozzle is open and for deactivating said second pump when the spray nozzle is closed.

4. The deicing system of claim 3 wherein said activating means includes a pressure sensor for sensing the drop and rise associated with the opening and closing, respectively, of said nozzle and computer control means coupled with said pressure sensor means and said second pump for causing said second pump to turn on when the sensed pressure drops below a preselected low level and causing the second pump to turn Off when the sensed pressure reaches a preselected high level.

5. The deicing system of claim 4 wherein said pressure sensor is positioned between said mixing means and said second pump.

6. The deicing system of claim 1 further comprising means for selectively purging water from the elements of the system except the water tank and replacing the water with deicing fluid in order to prevent damage by freezing.

7. The deicing system of claim 1 wherein said heat exchanger includes a plurality of coils formed in said second tank.

8. The deicing system of claim 1 wherein said heat control means includes a temperature sensor for sensing the temperature of deicing fluid in said second tank, a control valve positioned between said water heater and said heat exchanger, and a computer control coupled with said temperature sensor and said control valve for interrupting the flow of heated water through said heat exchanger when the temperature sensed by said temperature sensor reaches said preselected temperature.

9. The deicing system of claim 1 further comprising a first temperature sensor in said first tank for sensing the temperature of the water in said first tank and control means for deactivating said heater when the water is heated to a preselected temperature.

10. The deicing system of claim 1 wherein said second pump is a positive displacement pump.

11. The deicing system of claim 10 wherein said second pump is a pump selected for the group consisting of a diaphragm pump and a progressive cavity pump.

12. The deicing system of claim 1 wherein the fluid communication between said second tank and said mixing means consists essentially of a first length of smooth tubing between said second tank and said second pump, said second pump, and a second length of smooth tubing between said second pump and said mixing means.

13. The deicing system of claim 1 wherein said mixing means is a mixing tube having a first inlet in fluid communication with said first tank, a second inlet in fluid communication with second tank, and an outlet in fluid communication with said nozzle.

14. The deicing system of claim 13 wherein a mixing element is fixedly connected inside said mixing tube.

15. The deicing system of claim 6 wherein said purging means includes a purge valve in fluid communication with said second tank and said first pump and control means coupled with said purge valve and said first pump for causing a preselected amount of deicing fluid to flow through said heater and said heat exchanger to thereby replace water with deicing fluid.

16. The deicing system of claim 1 wherein said mixing control means includes means for sensing the speeds of said first pump and said second pump and a programmable computer coupled with said speed sensing means and said first and second pumps.

17. A deicing system for applying a deicing mixture including a Type II deicing fluid to an aircraft, the system comprising:
a first tank for holding water;
a second tank for holding Type II deicing fluid
a water heater in fluid communication with said first tank for heating the water;
a heat exchanger, located in second tank and in fluid communication with said heater, for accepting the heated water to heat the Type II deicing fluid;
a first pump in fluid communication with said first tank for pumping water;
a second pump in fluid communication with said second tank for pumping Type II deicing fluid without degenerating said Type II fluid;
a heater control means, coupled with said first pump, for controlling flow of the heated water through said heat exchanger until the temperature of the Type II deicing fluid in said second tank reaches a preselected temperature;
a mixing tube in fluid communication with said first and second tanks for mixing the water and the Type II fluid;
a mixing control means for providing a choice of a plurality of preselected mixtures of heated water and heated Type II deicing fluid to said mixing means;
as nozzle in fluid communication with said mixing means to apply one of the preselected mixtures to the aircraft; and second pump control means for activating said second pump when the spray nozzle is open and for deactivating said second pump when the spray nozzle is closed.

18. The deicing system of claim 17 wherein said that exchanger includes coils of elongated tubing positioned with their longitudinal axes parallel the bottom of said second tank.

19. The deicing system of claim 18 wherein said heat control means includes a temperature sensor for sensing the temperature of deicing fluid insaid second tank, a control valve positioned between said water heater and said heat exchanger, and a computer control coupled with said temperature sensor and said control valve of r interrupting the flow of heated water through said heat exchanger when the temperature sensed by said temperature sensor reaches said predetermined temperature.

20. The deicing system of claim 19 wherein said coils are positioned proximate the bottom of said second tank.

21. The deicing system of claim 17 wherein said second pump is a positive displacement pump selected from the group consisting of a diaphragm pump or a progressive cavity pump.

22. The deicing system of claim 21 wherein the fluid communication between said second tank and said mixing means consists essentially of a first length of smooth tubing between said second tank and said second pump, said second pump, and a second length of smooth tubing between said second pump and said mixing means.

23. The deicing system of claim 17 wherein a discontinues spiral mixing element is fixedly connected inside said mixing tube.

24. The deicing system of claim 23 wherein said mixing tube includes a cylindrical sleeve and a cap manifold fixed to said sleeve, said spiral mixing element is fixed to said cap manifold and is slidably received within said cylindrical sleeve, and said cap manifold has two separate inlets positioned on opposite sides of said spiral mixing element, whereby water can be introduced on one side of the spiral mixing element and Type II deicing fluid can be introduced on the other side of the spiral mixing element.

25. The deicing system of claim 17 wherein said mixing control means includes means for sensing the speeds of said first pump and said second pump and a computer coupled with said speed sensing means and said first and second pumps for keeping the ratio of the speeds of said first and second pumps at a preselected, constant ratio.

26. The deicing system of claim 17 wherein all of the elements of the system are placed on a mobile vehicle.

* * * * *

UNITED STATES PATENT AND TRADEMARK OFFICE
CERTIFICATE OF CORRECTION

PATENT NO. : 5,028,017
DATED : July 2, 1991
INVENTOR(S) : CHARLES M. SIMMONS ET AL.

It is certified that error appears in the above-identified patent and that said Letters Patent is hereby corrected as shown below:

Claim 4, column 13, line 48, "Off" should read --off--.
Claim 17, column 14, line 42, "fluid" should be followed by --;-- (semicolon).
Claim 18, column 15, line 5, "that" should read --heat--.
Claim 19, column 15, line 11, "insaid" should read --in said--.
Claim 19, column 15, line 14, "of r" should read --for--.
Claim 23, column 16, lines 5-6, "discontinues" should read --discontinuous--.
On Title Page:
Under "Inventors" (fifth line), "Charles W. Talleg" should read --Charles W. Talley--.

Signed and Sealed this

Tenth Day of November, 1992

*Attest:*

DOUGLAS B. COMER

*Attesting Officer*  *Acting Commissioner of Patents and Trademarks*